United States Patent [19]
Branik et al.

[11] Patent Number: 5,701,737
[45] Date of Patent: Dec. 30, 1997

[54] EXHAUST TREATMENT DEVICE FOR MOTOR VEHICLE

[75] Inventors: David P. Branik, Grosse Ile; Daniel A. Roulinson, Wyandotte; Gerald L. Umin, New Boston, all of Mich.

[73] Assignee: Ford Global Technologies, Inc., Dearborn, Mich.

[21] Appl. No.: 617,712

[22] Filed: Apr. 1, 1996

[51] Int. Cl.⁶ .................. F01N 3/28; F01N 7/18
[52] U.S. Cl. .................. 60/299; 29/890; 29/890.08; 181/282
[58] Field of Search .................. 60/299; 29/890, 29/890.08; 181/282; 422/177

[56] References Cited

U.S. PATENT DOCUMENTS

| | | | |
|---|---|---|---|
| 1,884,944 | 10/1932 | Williams | 285/11 |
| 2,475,834 | 7/1949 | Harvey | 285/271 |
| 3,002,269 | 10/1961 | Hopkins | 29/441.1 |
| 3,159,239 | 12/1964 | Andrews | 181/282 |
| 3,544,137 | 12/1970 | Contreras et al. | 285/261 |
| 3,786,890 | 1/1974 | Shank | 60/314 X |
| 3,874,706 | 4/1975 | Arnold | 285/24 |
| 4,372,344 | 2/1983 | Stafford | 137/615 |
| 4,553,775 | 11/1985 | Halling | 285/55 |
| 4,696,494 | 9/1987 | Schmitz et al. | 285/18 |
| 4,969,264 | 11/1990 | Dryer et al. | 29/890 |
| 5,069,487 | 12/1991 | Sheppard | 285/226 |
| 5,149,147 | 9/1992 | Kastrup et al. | 285/261 |

Primary Examiner—Tony M. Argenbright
Attorney, Agent, or Firm—Jerome R. Drouillard

[57] ABSTRACT

An exhaust treatment device for a motor vehicle includes upper and lower shells which are welded together to form inlet and outlet sections and a treatment section which may be occupied by a monolithic catalytic converter element. Inlet and outlet stubs which conduct exhaust gas into and out of the exhaust treatment device are joined to the device by means of generally hemispherical sockets formed integrally in the upper and lower shells and mating with hollow spherical sections incorporated in the inlet and outlet stubs.

16 Claims, 3 Drawing Sheets

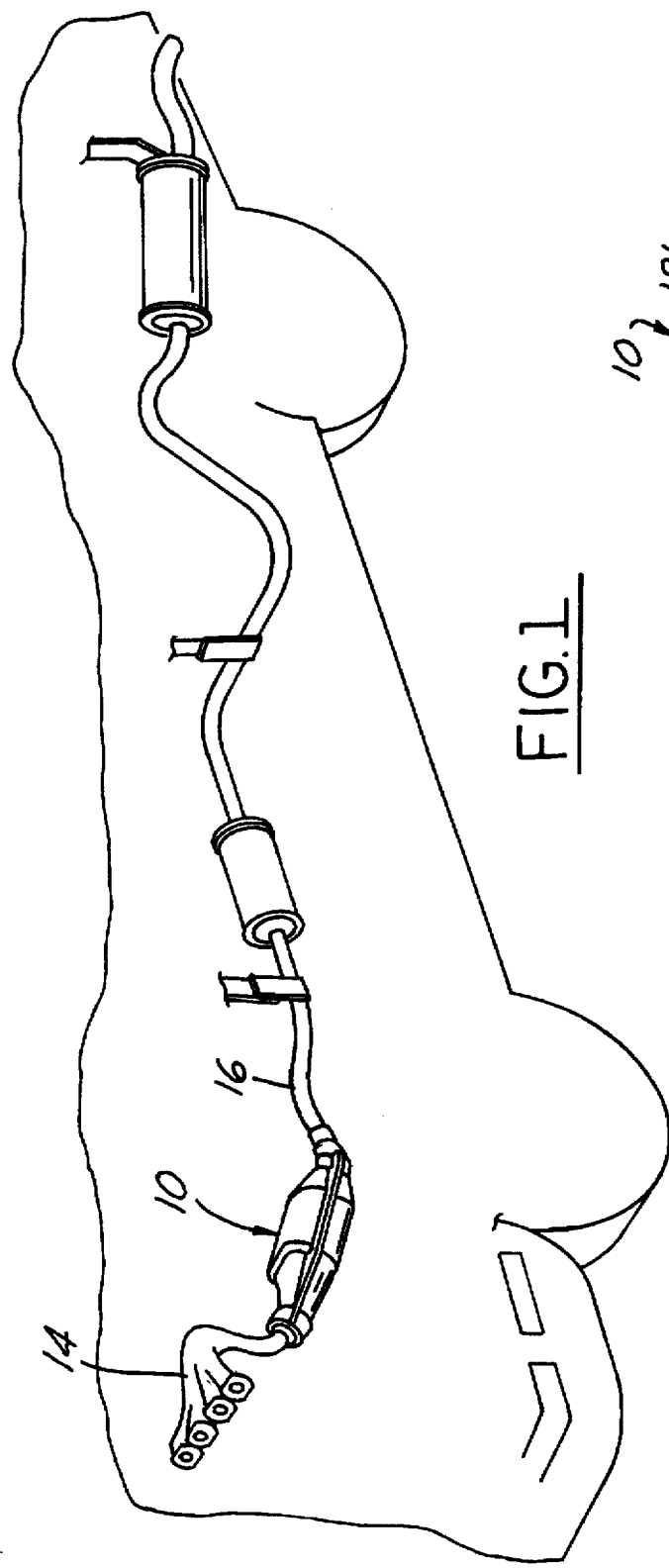
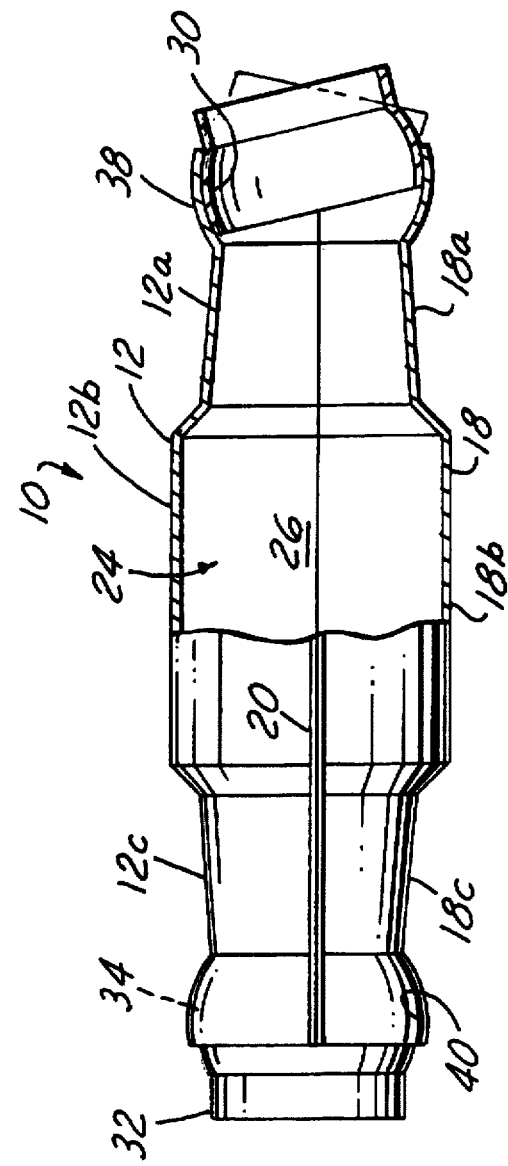
FIG.1
FIG.2

EXHAUST TREATMENT DEVICE FOR MOTOR VEHICLE

BACKGROUND OF THE INVENTION

1. Field of the Invention

This invention relates to a exhaust treatment device for a motor vehicle which may be easily packaged in a variety of configurations for use in a variety of different motor vehicles.

2. Disclosure Information

Exhaust treatment catalysts have been used for decades by the automotive industry, and such catalysts continue to be an important element in each manufacturer's program to meet exhaust emission control requirements. Because exhaust emission standards are becoming increasingly stringent, it has become necessary to develop concomitantly more effective exhaust treatment catalysis devices.

In their efforts to extract maximum efficiency from catalytic converters, automotive designers have sought to package such converters closer and closer to the engine. Close mounting of catalytic converter devices allows such devices to "light off" rapidly, or, in other words, to begin working as soon as possible after the engine is started. Unfortunately, however, the space within automotive engine compartments and in the toe board area is increasingly crowded, particularly with front wheel drive vehicles having the engine in the east-west configuration. This has necessitated that designers devise unique catalysts for each engine and vehicle combination, a situation which requires much added expense and unwanted complexity. The inventors of the present exhaust treatment device have determined, however, that a robust exhaust treatment device may be constructed with the capability of orienting the inlet and outlet stubs at a plurality of different angles, without changing the configuration of any of the components of the container in which the exhaust treatment device is maintained. U.S. Pat. No. 3,159,239 illustrates an exhaust muffler having a three-piece housing in which a cylindrical tube has spun down ends to which an inlet and outlet are welded. Although it is possible to change the orientation of the inlet and outlet with the design shown in the '239 patent, the structure for retaining the inlet and outlet to the main body of the muffler is not robust because the inlet and outlet are not socketed to the main body, as is the case with the present invention. Rather, the inlet and outlet are merely lapped over and welded to the outer container.

An exhaust treatment device according to the present invention uses a ball and socket arrangement which allows attachment of the inlet and outlet stubs to exhaust treatment device in a variety of angular orientations, with a high degree of structural integrity. This is important because it renders an exhaust treatment device according to the present invention more easily manufactured by a metal stamping process, but with a more robust design. In addition, the muffler of the '239 patent cannot be constructed by stamping, which is important in high-volume production. And, the muffler of the '239 patent can only be employed with a circular configuration because the shell ends are spun down or swaged, which operations are not possible with respect to a device having flanged construction as with the exhaust treatment device of the present invention.

SUMMARY OF THE INVENTION

An exhaust treatment device for a motor vehicle includes an upper shell having an upper inlet section and an upper outlet section, with an upper central body section extending therebetween, and a lower shell having a lower inlet section and a lower outlet section, with a lower central body section extending therebetween. The upper shell is superimposed upon and mated with the lower shell. Together, the upper and lower shells define an inlet flow path formed by the upper inlet section and the lower inlet section and an outlet flow path formed by the upper outlet section and the lower outlet section. The upper and lower shells also define a treatment space formed by the upper central body section and the lower central body section. The treatment space extends between the inlet flow path and the outlet flow path. An exhaust treatment element is housed in the treatment space. Those skilled in the art will appreciate in view of this disclosure that the exhaust treatment element may comprise either a monolithic substrate for use as a catalytic exhaust treatment device; alternatively, the exhaust treatment element could comprise a muffler which does not treat the exhaust other than to muffle noise emanating from the exhaust. As another alternative, the exhaust treatment may comprise a carrier for pelleted exhaust treatment catalysis elements.

An inlet stub conducts exhaust gas into the inlet flow path, and an outlet stub conducts exhaust gas from the outlet flow path of the present device. The inlet stub is connected with the inlet flow path via a generally hemispherical socket formed integrally from the upper shell and the lower shell. Similarly, the outlet stub is connected with the outlet flow path by means of an outlet connector section which comprises a generally hemispherical socket formed integrally from the upper shell and the lower shell in a location abutting the outlet flow path.

It is an advantage of the present invention that an exhaust treatment device, particularly of the catalytic converter type, may comprise a welded shell having two halves formed of metal stampings, including hemispherical sockets for connecting pipe stubs.

BRIEF DESCRIPTION OF THE DRAWINGS

FIG. 1 is a schematic representation of a vehicle having an exhaust treatment device according to the present invention.

FIG. 2 is a side view, partially broken away, of an exhaust treatment device according to the present invention.

DETAILED DESCRIPTION OF PREFERRED EMBODIMENTS

As shown in FIG. 1, an automotive vehicle has an exhaust system with a close-coupled exhaust treatment device 10. The exhaust treatment device 10 is mounted between exhaust manifold 14 which would normally be attached to the engine (not shown) of the vehicle. Exhaust treatment device 10 is also mounted to exhaust pipe 16 of the vehicle.

Figure 3:
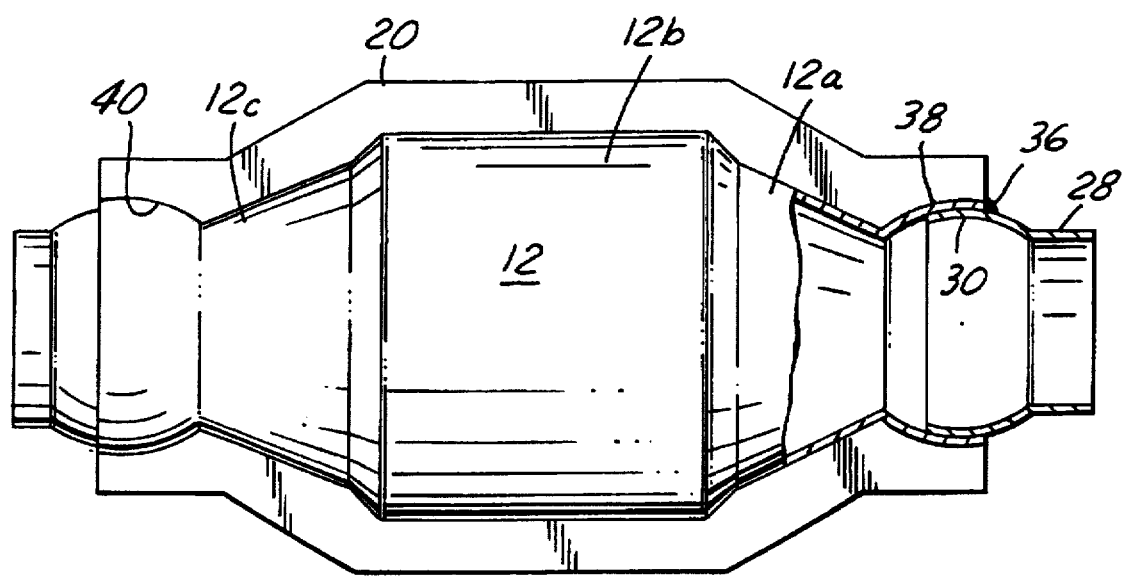
FIG. 3 is a plan view of the upper shell of an exhaust treatment device according to the present invention.
Figure 4:
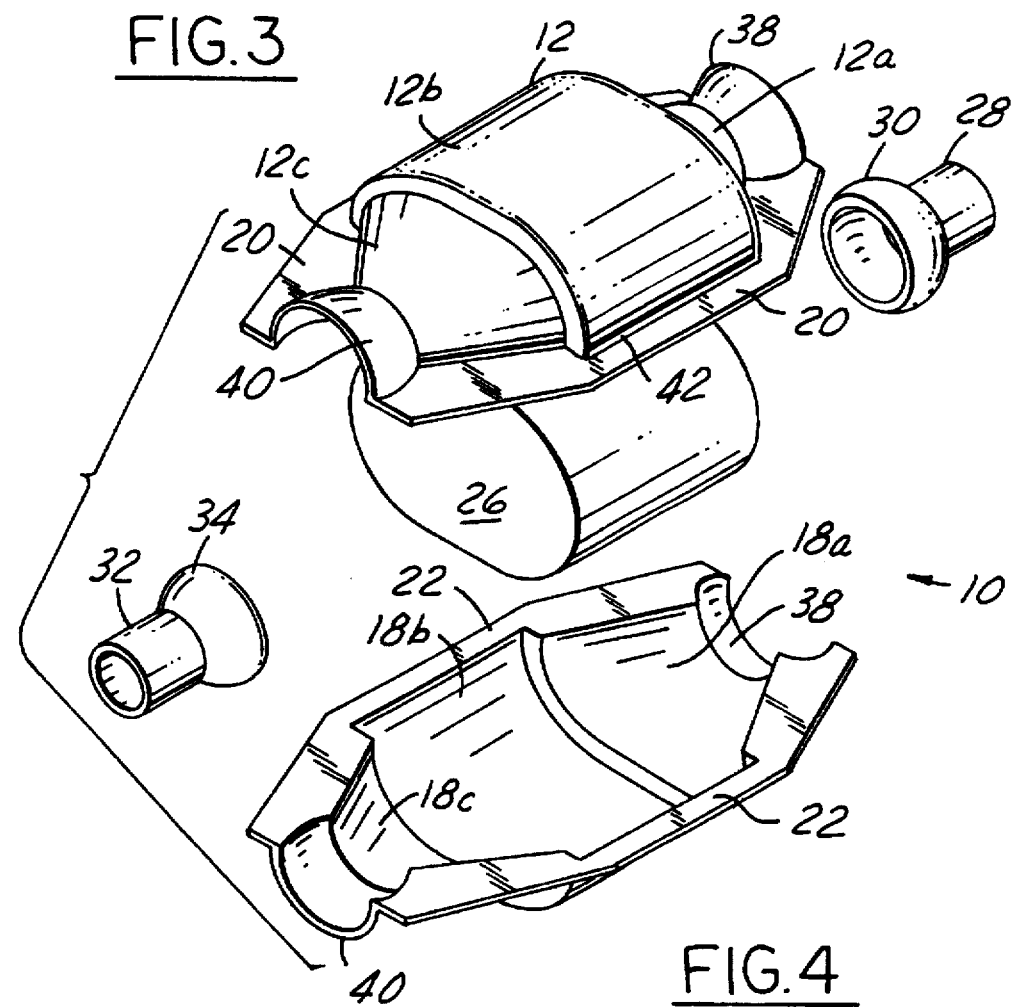
FIG. 4 is an exploded perspective view of an exhaust treatment device according to the present invention.

Exhaust treatment device 10 according to the present invention has a generally oblong center section for housing exhaust treatment element 26. The oblong aspect ratio of exhaust treatment element 26 is clearly visible by referring to FIG. 4, in which the exhaust treatment element is shown in perspective, and by comparing FIGS. 2, 4, and 5. As shown in FIG. 2, exhaust treatment device 10 appears to be cylindrical, and includes upper shell 12 and lower shell 18. Upper shell 12 is shown with particularity in FIG. 3. Each of the upper and lower shells has an inlet section, center body section, and an outlet section. In the case of upper shell 12, inlet section is shown at 12a, central body section body at 12b, and the outlet section at 12c. As shown in FIG. 4, lower shell 18 has lower inlet section 18a, lower central body section 18b, and a lower outlet section 18c. The upper and lower shell halves, together form a unitary container having frustroconical inlet and outlet sections, with elliptically shaped treatment section or space 24 extending therebetween. As seen from the various figures, the frustroconical spaces defined by upper inlet section 12a and lower inlet section 18a, for example, have oblong configurations in their base regions which correspond to oblong cross sectional configuration of treatment space 24. As noted above, this oblong configuration is important because it allows an exhaust treatment device according to the present invention to be packaged in spaces where a cylindrically shaped exhaust treatment device having comparable flow area would simply not fit. The previously described frustroconical spaces have generally circular configurations at their apex regions; this allows an easy transition to the hemispherical sockets formed at the ends of the combined upper and lower shell halves.

Figure 5:
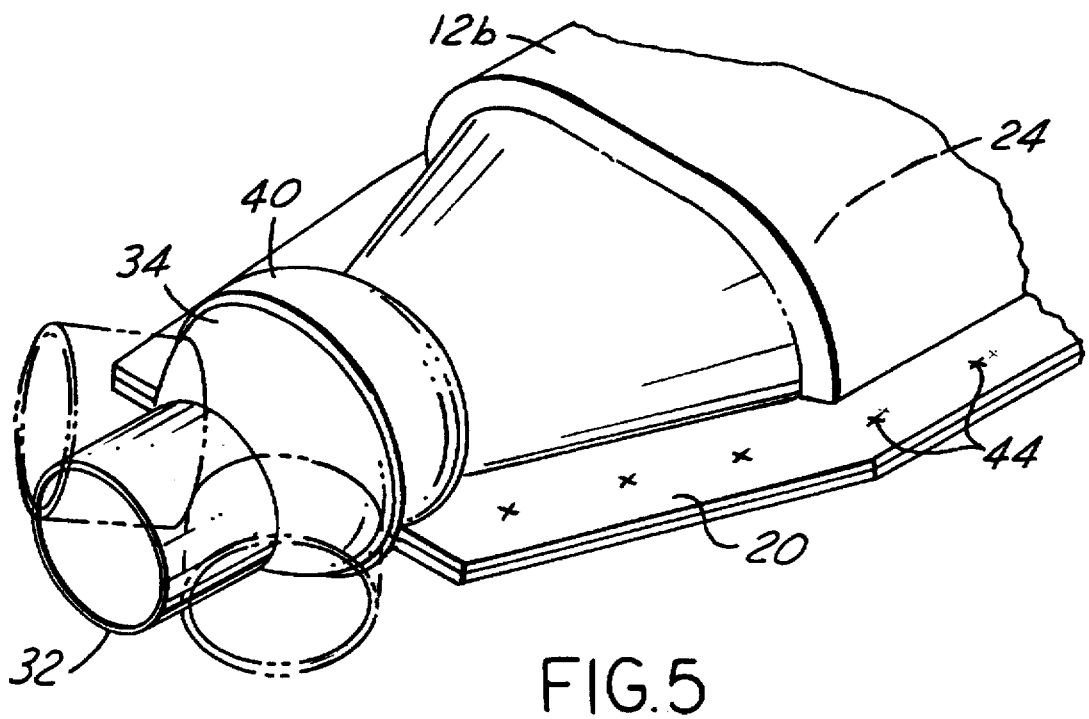
FIG. 5 is a perspective view of the exhaust treatment device according to the present invention, showing the extent to which the inlet and outlet stubs can be oriented in different positions.

An exhaust treatment device according to the present invention may be advantageously manufactured by stamping upper shell 12 and lower shell 18 such that the shells are unitary, with each shell having two longitudinally extending flanges which are joined together by seam welding, spot welding, fusion welding, or some other sort of welding or bonding process. A seam weld is shown at 42 in FIG. 4; spot welds 44 are shown in FIG. 5. Manufacturing of shells 12 and 18 by a stamping process provides an easily deployed means for forming generally hemispherical inlet socket 38 and generally hemispherical outlet socket 40. Each of inlet sockets 38 and outlet sockets 40 is comprised of subhemispheres formed in the upper and lower shells. This is advantageous because the presence of weld flange 20 would render spinning or turning of generally hemispherical sockets 38 and 40 a difficult proposition. Instead, stamping of shells 12 and 18 allows sockets to be formed easily, quickly, and precisely, allowing an exhaust treatment device according to the present invention to be made economically.

Figure 6:
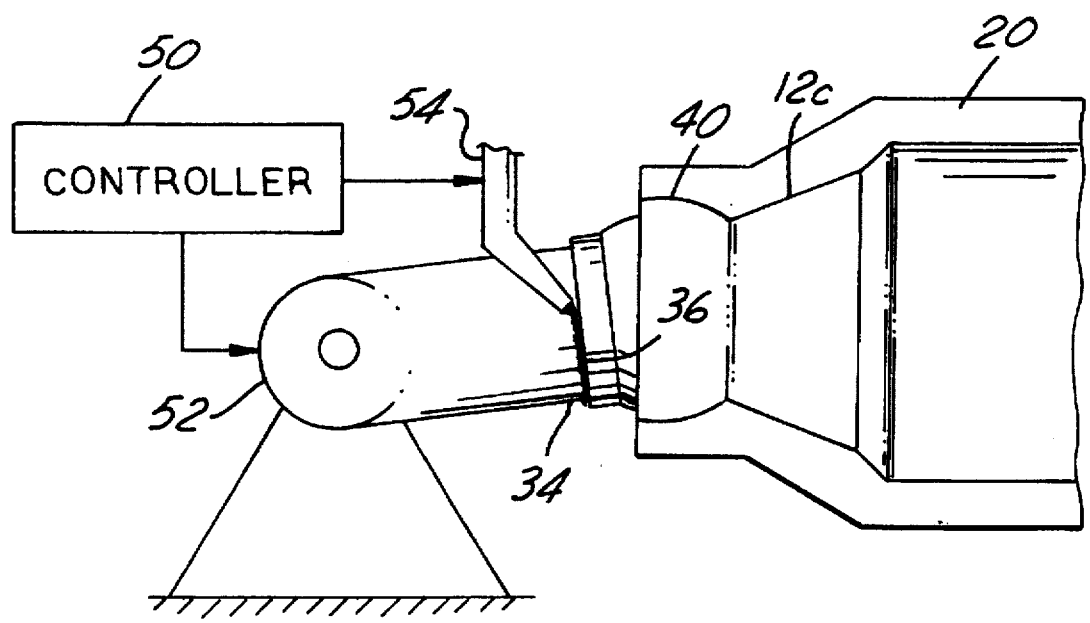
FIG. 6 is a schematic representation of a robotic device for positioning and welding the inlet and outlet stubs into their respective hemispherical sockets according to another aspect of the present invention.

Hemispherical sockets 38 and 40, when combined with the welding shown in FIG. 6, provide a robust mounting system for exhaust inlet stub 28 and exhaust outlet stub 32. As shown in the various figures, inlet stub 28 has a hollow spherical section 30 incorporated with a straight pipe section 28; outlet stub 32 has a similar hollow spherical section 34 attached thereto.

Because inlet stub 28 and outlet stub 32 may be engaged with upper shell 12 and lower shell 18 after the shells have been welded or otherwise joined together, the present exhaust treatment device may be used as a universal replacement exhaust treatment device for automotive vehicles. Thus, the welded assembly of upper shell 12 and lower shell 18 may be supplied with a plurality of partially spherical, weldable exhaust pipe stubs having different diameters. This permits an automotive technician to select a pipe having an appropriate diameter to telescope with existing exhaust pipes installed on a vehicle. Then exhaust pipe stubs 28 and 32 may be engaged with the previously welded shell assembly and positioned to an appropriate angular orientation and then welded in place with a fusion weld. FIG. 5 shows that pipe stubs 28 and 32 may be oriented in a wide variety of angular orientations.

A fusion weld for completing attachment of the pipe stubs to the shell assembly may be applied by a machine having a metal inert gas (MIG) gun, as shown in FIG. 6, or with a manual MIG gun, or other welding process known to those skilled in the art and suggested by this disclosure.

Interchangeability of exhaust pipe stubs 28 and 32 is promoted by the fact that the hollow spherical section of each of the pipe stubs may have substantially the same diameter so as to permit engagement with the hemispherical sockets of the shell, whereas the pipe stubs may have different diameters in their cylindrical portions.

FIG. 6 illustrates a robotic welder for positioning pipe stubs 28 and 32, and for welding them in place. In this case, controller 50 positions stub 32 in a desired angular orientation selected from the range of orientations shown in FIG. 5, and thereafter MIG gun 54 is robotically applied to produce fusion weld 36, which robustly and reliably produces a gas-tight joint between hollow spherical section 34 of outlet stub 32 and generally hemispherical outlet socket 40. It is noted from the various figures that each of the generally hemispherical inlet and outlet sockets engages the hollow spherical sections of the inlet and outlet stubs at least to the tangent point of the hollow spherical sections, which provides much more support for the inlet and outlet stubs than would be the case with the mounting system according to the '239 patent.

While the best mode for carrying out the invention has been described in detail, those familiar with the arts to which this invention relates will recognize alternative designs and embodiments for practicing the invention. For example, the cross-sectional configuration of the exhaust treatment element and, consequently, the configuration of the shell assembly, may be varied to accommodate the requirements of an individual application of the current invention. Thus, the above-described preferred embodiment is intended to be merely illustrative of the invention, which may be modified within the scope of the following claims.

What is claimed:

1. An exhaust treatment device for a motor vehicle, comprising:

an upper shell having an upper inlet section and an upper outlet section, with an upper central body section extending therebetween;

a lower shell having a lower inlet section and a lower outlet section, with a lower central body section extending therebetween, and with said upper shell being superimposed upon and mated with said lower shell, thereby defining an inlet flow path formed by the upper inlet section and the lower inlet section, an outlet flow path formed by the upper outlet section and the lower outlet section, and a treatment space formed by the upper central body section and the lower central body section and extending between the inlet flow path and the outlet flow path;

an exhaust treatment element housed in the treatment space;

an inlet stub for conducting exhaust gas into the inlet flow path;

an outlet stub for conducting exhaust gas from the outlet flow path;

an inlet connector section for connecting the inlet stub with the inlet flow path; and an outlet connector section for connecting the exit stub with the outlet flow path, with at least one of said inlet or outlet connector sections comprising a generally hemispherical socket formed integrally from end portions of the upper shell and the lower shell in a location abutting at least one of said inlet flow path and said outlet flow path, with said generally hemispherically socket mating with a hollow spherical section incorporated in at least one of said inlet stub or said outlet stub.

2. An exhaust treatment device according to claim 1, wherein said upper shell and said lower shell are unitary, with each shell having two longitudinally extending flanges which are joined together.

3. An exhaust treatment device according to claim 2, wherein said longitudinally extending flanges are welded together by a continuous seam weld.

4. An exhaust treatment device according to claim 2, wherein said longitudinally extending flanges are welded together by a plurality of spot welds.

5. An exhaust treatment device according to claim 1, wherein said upper shell and said lower shell each has one-half of a hemispherical socket formed in its inlet section, and one-half of a hemispherical socket formed in its outlet section.

6. An exhaust treatment device according to claim 5, wherein the inlet and outlet flow paths each comprises a frustroconical space having a base region abutting the treatment space, with an apex region of each frustroconical space abutting one of said hemispherical sockets.

7. An exhaust treatment device according to claim 6, wherein said frustroconical spaces have oblong configurations in their base regions, which correspond to an oblong configuration in said treatment space, with said frustroconical spaces further having circular configurations in their apex regions, which correspond to a circular configuration in each of said hemispherical sockets.

8. An exhaust treatment device according to claim 1, further comprising a catalytic converter element positioned within said treatment space.

9. An exhaust treatment device according to claim 1, further comprising an exhaust noise muffler positioned within said treatment space.

10. An exhaust treatment device according to claim 1, wherein said upper and lower shell are metal stampings.

11. An exhaust treatment device for a motor vehicle, comprising a welded shell comprised of stamped upper and lower shell halves which are seam welded together to form a unitary container having frustroconical inlet and outlet sections, with a treatment section extending therebetween, with said treatment section having an exhaust treatment element positioned therein, and with said shell further comprising a stamped hemispherical socket abutting each of said frustroconical inlet and outlet sections, and with each of said sockets having a partially spherical pipe stub housed therein and extending therefrom, with each of said pipe stubs being welded into one of said sockets.

12. An exhaust treatment device according to claim 11, wherein said exhaust treatment element comprises a catalytic converter.

13. An exhaust treatment device according to claim 11, wherein said exhaust treatment element comprises an exhaust noise muffler.

14. An exhaust treatment device according to claim 11, wherein said pipe stubs are positioned and welded by a robotic welder.

15. A universal replacement exhaust treatment device for an automotive vehicle, comprising:

a shell comprised of upper and lower shell halves which are seam welded together to form a unitary container having frustroconical inlet and outlet sections, with a treatment section extending therebetween, with said treatment section having an exhaust treatment element positioned therein, and with said shell further comprising a hemispherical socket abutting each of said frustroconical sections; and a plurality of partially spherical, weldable exhaust pipe stubs, with each stub comprising a hollow spherical section joined with a length of exhaust tubing, with the hollow spherical section of each of said pipe stubs being adapted for engagement within said sockets so as to be weldable in a plurality of angular orientations, thereby permitting more than one angular orientation of each of said pipe stubs.

16. An exhaust treatment device according to claim 15, wherein the hollow spherical section of each of said pipe stubs has substantially the same diameter, so as to permit engagement with the hemispherical sockets of said shell, with said lengths of exhaust tubing attached to the spherical sections having various pipe diameters, so as to permit engagement of the pipe stubs with more than one diameter of exhaust pipe.

* * * * *